(12) United States Patent
Abad et al.

(10) Patent No.: US 10,030,131 B2
(45) Date of Patent: Jul. 24, 2018

(54) PNEUMATIC OBJECT PROVIDED WITH A GASTIGHT LAYER CONTAINING A THERMOPLASTIC ELASTOMER AND A THERMOPLASTIC

(75) Inventors: Vincent Abad, Clermont-Ferrand (FR); Emmanuel Custodero, Clermont-Ferrand (FR); Vincent Lemal, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 537 days.

(21) Appl. No.: 13/643,147

(22) PCT Filed: May 10, 2011

(86) PCT No.: PCT/EP2011/057527
§ 371 (c)(1),
(2), (4) Date: Dec. 5, 2012

(87) PCT Pub. No.: WO2011/141466
PCT Pub. Date: Nov. 17, 2011

(65) Prior Publication Data
US 2013/0072621 A1 Mar. 21, 2013

(30) Foreign Application Priority Data
May 12, 2010 (FR) .................................... 10 53744

(51) Int. Cl.
| | | |
|---|---|---|
| *C08L 25/08* | (2006.01) | |
| *B29C 47/92* | (2006.01) | |
| *B29C 47/00* | (2006.01) | |
| *C08L 35/06* | (2006.01) | |
| *C08L 33/08* | (2006.01) | |
| *B60C 1/00* | (2006.01) | |
| *B82Y 30/00* | (2011.01) | |
| *C08L 53/00* | (2006.01) | |
| *C08L 53/02* | (2006.01) | |
| *C08L 77/06* | (2006.01) | |
| *B60C 5/14* | (2006.01) | |

(52) U.S. Cl.
CPC .......... *C08L 25/08* (2013.01); *B29C 47/0004* (2013.01); *B29C 47/0009* (2013.01); *B29C 47/92* (2013.01); *B60C 1/0008* (2013.01); *B60C 5/14* (2013.01); *C08L 33/08* (2013.01); *C08L 35/06* (2013.01); *C08L 53/00* (2013.01); *B29C 2947/92704* (2013.01); *B82Y 30/00* (2013.01); *C08L 53/02* (2013.01); *C08L 77/06* (2013.01); *C08L 2666/14* (2013.01); *Y10S 977/773* (2013.01)

(58) Field of Classification Search
CPC ...... C08L 53/00; C08L 2666/14; C08L 77/00; C08L 77/06; C08L 53/02; B60C 1/0008; B60C 1/0025; B60C 5/14

USPC ............................ 152/564; 524/449; 525/93
See application file for complete search history.

(56) References Cited

U.S. PATENT DOCUMENTS

| | | | |
|---|---|---|---|
| 4,946,899 A * | 8/1990 | Kennedy et al. ............. | 525/244 |
| 5,260,383 A | 11/1993 | Osman .......................... | 525/232 |
| 6,610,261 B1 | 8/2003 | Custodero et al. ........... | 423/127 |
| 2004/0194863 A1 | 10/2004 | Grah ............................ | 152/510 |
| 2007/0144644 A1* | 6/2007 | Zanzig ...................... | B60C 1/00 152/209.5 |
| 2008/0216933 A1* | 9/2008 | Otsuki .................. | B60C 1/0008 152/510 |
| 2009/0160078 A1 | 6/2009 | Abad et al. ............... | 264/178 R |
| 2009/0199942 A1* | 8/2009 | Tanno ..................... | B29C 65/02 152/157 |
| 2009/0302760 A1* | 12/2009 | Tchakarov et al. .......... | 313/512 |
| 2010/0263778 A1* | 10/2010 | Lesage et al. ............... | 152/511 |
| 2011/0011511 A1* | 1/2011 | Miyazaki et al. ............ | 152/564 |
| 2011/0198010 A1* | 8/2011 | Voge et al. .................. | 152/502 |
| 2011/0277901 A1* | 11/2011 | Lesage et al. ............... | 152/510 |
| 2012/0003409 A1* | 1/2012 | Lesage et al. ............... | 428/35.7 |
| 2012/0149822 A1 | 6/2012 | Abed et al. .................. | 524/449 |
| 2012/0156400 A1 | 6/2012 | Abed et al. .................. | 428/12 |
| 2012/0180923 A1 | 7/2012 | Custodero et al. ........... | 152/502 |
| 2012/0285597 A1 | 11/2012 | Abad et al. .................. | 152/450 |
| 2012/0315408 A1* | 12/2012 | Chouvel et al. ............... | 428/12 |
| 2013/0168001 A1* | 7/2013 | Abad et al. .................. | 152/511 |
| 2013/0209716 A1* | 8/2013 | Custodero et al. .......... | 428/36.8 |

(Continued)

FOREIGN PATENT DOCUMENTS

| | | |
|---|---|---|
| EP | 0 731 112 A2 | 9/1996 |
| EP | 1 431 343 A1 | 6/2004 |
| EP | 1 561 783 A1 | 8/2005 |
| EP | 1 566 405 A1 | 8/2005 |
| FR | 2 916 680 A1 | 12/2008 |
| WO | WO 2005/103146 A1 | 11/2005 |
| WO | WO 2006/047509 A2 | 5/2006 |
| WO | WO 2009/007064 * | 1/2009 |
| WO | WO 2009/007064 A1 | 1/2009 |
| WO | WO 2009/119232 A1 | 10/2009 |
| WO | WO 2009119232 * | 10/2009 |
| WO | WO 2010/012413 * | 2/2010 |
| WO | WO 2010/012413 A1 | 2/2010 |
| WO | WO 2010/057612 * | 5/2010 |

OTHER PUBLICATIONS

J.E. Puskas et al. "Polyisobutylene-Containing Block Polymers by Sequential Monomer Addition. IV. New Triblock Thermopolastic Elastomers Comprising High $T_g$ Styrenic Glassy Segments: Synthesis, Characterization and Physical Properties"; Journal of Polymer Science: Part A: Polymer Chemistry, vol. 30, 1992, pp. 41-48.

(Continued)

*Primary Examiner* — Melissa A Rioja
(74) *Attorney, Agent, or Firm* — Fitzpatrick, Cella, Harper & Scinto

(57) ABSTRACT

A pneumatic object or inflatable article is provided with a gastight elastomer layer. The gastight elastomer layer includes a thermoplastic polyisobutylene block elastomer and hot-melt polymer microdomains based on at least one thermoplastic material.

34 Claims, 2 Drawing Sheets

(56) References Cited

U.S. PATENT DOCUMENTS

Figure 1:
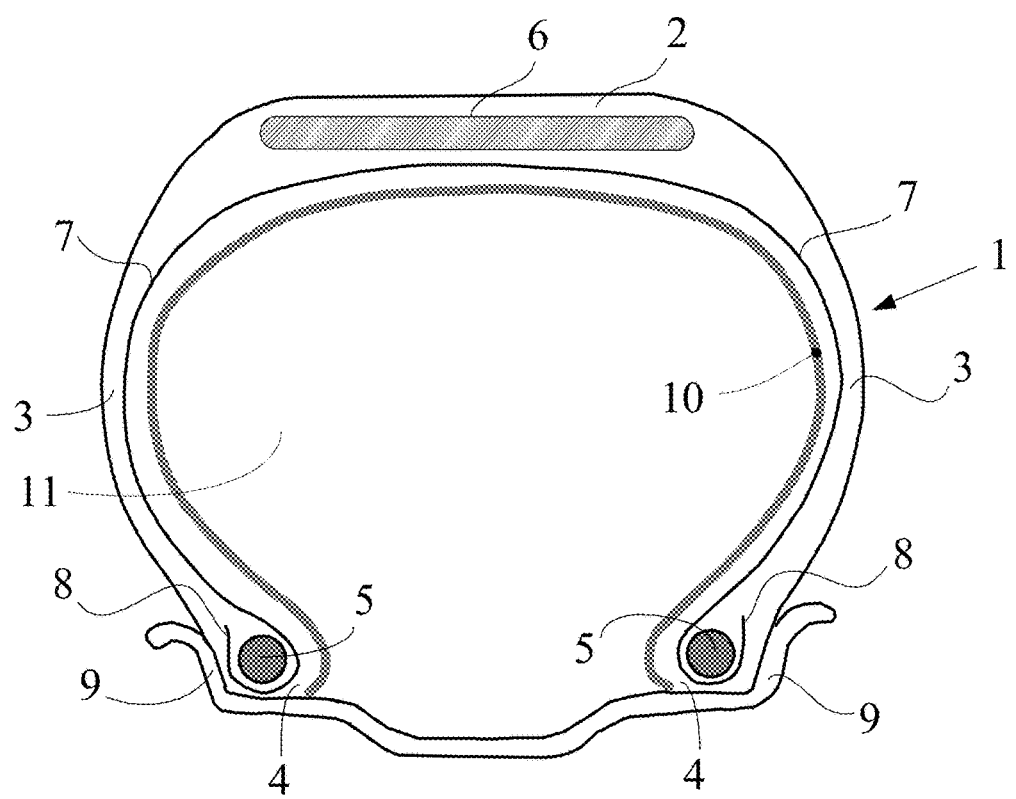

2014/0166083 A1* 6/2014 Vacca ............... C09K 3/1006
136/251
2015/0289637 A1* 10/2015 Vasilakes ............ A46B 9/028
15/207.2

OTHER PUBLICATIONS

J.P. Kennedy et al., "Polyisobutylene-Containing Block Polymers by Sequential Monomer Addition. 5. Synthesis, Characterization, and Select Properties of Poly (p-tert-butylstyrene-b-isobutylene-b-p-tert-butylstyrene)"; Macromolecules, 1991, vol. 24, pp. 6572-6577.

G. Kaszas et al., "New Thermoplastic Elastomers of Rubbery Polyisobutylene and Glassy Cyclopolyisoprene Segments"; Journal of Applied Polymer Science, vol. 39, 1990, pp. 119-144.

J.E. Puskas et al., "New Transparent Flexible UV-Cured Films from Polyisobutylene-Polyisoprene Block Polymers"; Journal of Macromolecular Science-Chemistry, vol. A28(1), 1991, pp. 65-80.

J.P. Kennedy et al., "Polyisobutylene-Containing Block Polymers by Sequential Monomer Addition. 8. Synthesis, Characterization, and Physical Properties of Poly (indene-b-isobutylene-b-indene) Thermoplastic Elastomers"; Macromolecules, vol. 26, 1993, pp. 429-435.

J.P. Kennedy et al., "Poly(methyl methacrylate)-block-polyisobutylene-block-poly (methyl methacrylate) Thermoplastic Eslastomers: Synthesis, Characterization, and Some Mechanical Properties", in Catalysis in Polymer Synthesis, pp. 258-277, (E.J. Vandenberg, et al. eds.), 1992.

D. Feng et al., "Facile Synthesis of Diphenylethylene End-Functional Polyisobutylene and its Applications for the Systhesis of Block Copolymers Containing Poly(methacrylate)s"; Polymer, vol. 49, 2008, pp. 386-393.

J. Puskas et al., "Multiarm-Star Polyisobutylenes by Living Carbocationic Polymerization"; Journal of Polymer Science: Part A: Polymer Chemistry, vol. 36, 1998, pp. 85-92.

J. Puskas et al., "Synthesis and Characterization of Novel Dendritic (Arborescent, Hyperbranched) Polyisobutylene-Polystyrene Block Copolymers", Journal of Polymer Science: Part A: Polymer Chemistry, vol. 43, 2005, pp. 1811-1826.

Z. Fodor et al., "Polyisobutylene-containing block polymers by sequential monomer addition"; Polymer Bulletin, vol. 29 (6), 1992, pp. 697-704.

* cited by examiner

PNEUMATIC OBJECT PROVIDED WITH A GASTIGHT LAYER CONTAINING A THERMOPLASTIC ELASTOMER AND A THERMOPLASTIC

FIELD OF THE INVENTION

The present invention relates to inflatable articles or "pneumatic" objects, that is to say, by definition, to articles which take their usable form when they are inflated with air or with an equivalent inflation gas.

It relates more particularly to the gastight layers which ensure that these inflatable articles are airtight, in particular that pneumatic tyres are airtight.

BACKGROUND

In a conventional pneumatic tyre of the "tubeless" type (that is to say of the type without an inner tube), the radially internal face comprises an airtight layer (or more generally a layer airtight to any inflation gas) which makes it possible to inflate the pneumatic tyre and to keep it under pressure. Its airtightness properties allow it to guarantee a relatively low level of pressure loss, making it possible to keep the tyre inflated in a normal operating state for a sufficient period of time, normally of several weeks or several months. Another role of this layer is to protect the carcass reinforcement and more generally the remainder of the tyre from the risk of oxidation due to the diffusion of air originating from the space interior to the tyre.

This role of airtight inner layer or "inner liner" is today fulfilled by compositions based on butyl rubber (copolymer of isobutylene and isoprene), which have been recognized for a very long time for their excellent airtightness properties.

However, a well-known disadvantage of compositions based on butyl rubber is that they exhibit high hysteresis losses, furthermore over a broad temperature spectrum, which disadvantage is damaging to the rolling resistance of the pneumatic tyres.

To reduce the hysteresis of these airtight inner layers and thus, in the end, the fuel consumption of motor vehicles is a general objective which current technology comes up against.

Document WO 2009/007064 of the Applicant companies discloses a pneumatic object provided with a layer airtight to the inflation gases, in which the airtight layer comprises an elastomer composition comprising at least a styrene thermoplastic (TPS) elastomer, a platy filler and optionally a polybutene oil. In comparison with a butyl rubber, the TPS elastomer exhibits the major advantage, due to its thermoplastic nature, of being able to be worked as is in the molten (liquid) state and consequently of offering the possibility of simplified processing while ensuring an airtightness at least equal to if not greater than that obtained with a conventional airtight layer made of butyl rubber.

A limitation of the endurance performance of these airtight layers is however observed when the content of platy fillers becomes significant.

BRIEF DESCRIPTION OF THE INVENTION

In the continuance of their research, the Applicant companies have now discovered a composition in which the use of platy fillers is optional, the important factor being the use of thermoplastic materials that are incompatible with the thermoplastic elastomer constituting the matrix of the airtight layer.

Thus, the invention relates to a pneumatic object or inflatable article provided with a gastight elastomer layer comprising, as the sole elastomer or as the predominant elastomer by weight, at least one thermoplastic polyisobutylene block elastomer, characterized in that said airtight elastomer layer comprises hot-melt polymer microdomains based on at least one thermoplastic material.

The hot-melt polymer microdomains have the advantage of reinforcing the gastightness of the airtight elastomer layer. These hot-melt polymer microdomains are obtained during the manufacture of the airtight elastomer layer. This airtight elastomer layer is produced by melt kneading the thermoplastic polyisobutylene block elastomer, constituting the matrix of the airtight elastomer layer, and the thermoplastic material constituting these hot-melt polymer microdomains. After cooling this mixture, the presence of these microdomains is observed, in particular by observations using a scanning electron microscope.

Another subject of the invention is a process for manufacturing a gastight elastomer composition comprising, as the sole elastomer or as the predominant elastomer by weight, a thermoplastic polyisobutylene block elastomer having a given melting or softening temperature ($T_{M1}$) and a thermoplastic material having a given melting or softening temperature ($T_{M2}$) using an extrusion tool with at least a feed and an outlet, said process comprising the following steps:

introducing the thermoplastic elastomer and the thermoplastic material into the feed(s) of the extrusion tool;

melting and kneading the constituents by bringing all the constituents to a kneading temperature ($T_M$) above both the given melting or softening temperatures ($T_{M1}$, $T_{M2}$) during the transfer into the body of the extrusion tool; and dispensing the resulting composition at the outlet of the extrusion tool with a die of suitable cross section.

The invention relates more particularly to the pneumatic tyres intended to be fitted on motor vehicles of the passenger type, SUVs (Sport Utility Vehicles), two-wheel vehicles (especially motorcycles), aircraft, and also industrial vehicles selected from vans, "heavy-duty" vehicles, i.e., underground trains, buses, heavy road transport vehicles (lorries, tractors, trailers), off-road vehicles, such as agricultural or civil engineering machines, and other transport or handling vehicles.

I. DESCRIPTION OF THE FIGURES

Figure 2:
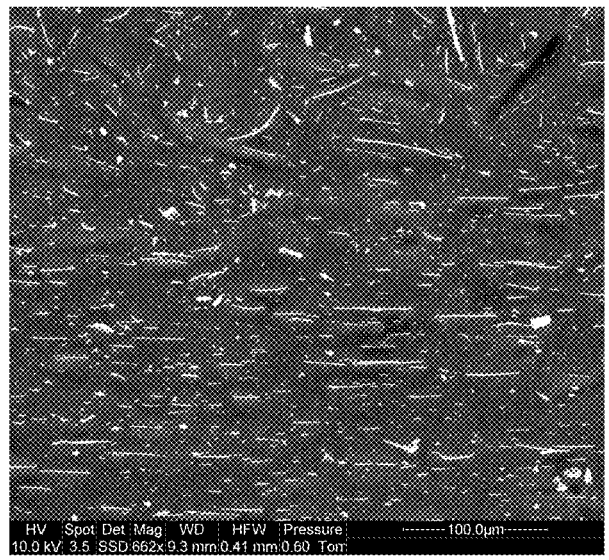
Figure 3:
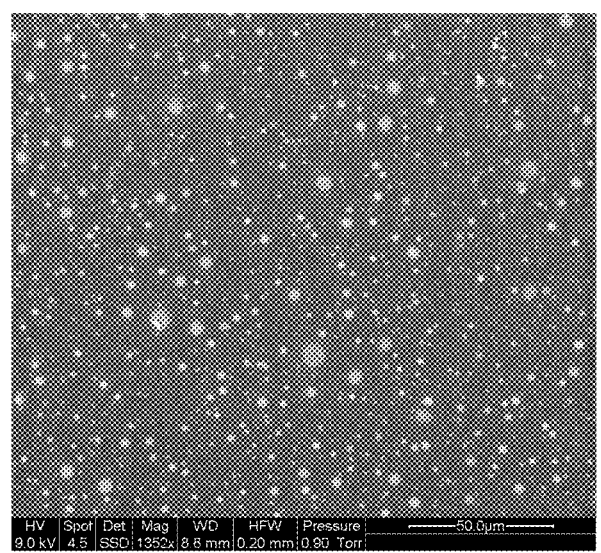

The invention and its advantages will be easily understood in the light of the description and the exemplary embodiments that follow, and also from the following appended figures in which:

FIG. 1 represents, very schematically, a radial cross section of a pneumatic tyre in accordance with the invention;

FIG. 2 presents a scanning electron microscope photograph of a cross section of a thermoplastic elastomer composition comprising a platy filler; and FIG. 3 presents a similar photograph for a thermoplastic elastomer composition comprising thermoplastic microdomains.

II. DETAILED DESCRIPTION OF THE INVENTION

In the present description, unless expressly indicated otherwise, all the percentages (%) shown are % by weight.

The volume percentage of a constituent of a composition is understood to mean the percentage, by volume, of this constituent relative to the volume of the whole of the composition.

Furthermore, any range of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

II-1. Gastight Elastomer Composition

The pneumatic object according to the invention has the essential characteristic of being provided with an elastomer layer which is airtight to the inflation gases, comprising at least, as the sole elastomer or as the predominant elastomer by weight present in said composition, a thermoplastic polyisobutylene block elastomer, associated with a thermoplastic material, and optionally an extender oil of the thermoplastic polyisobutylene block elastomer.

II-1-A. Thermoplastic Polyisobutylene Block Elastomer

Thermoplastic elastomers have a structure intermediate between thermoplastic polymers and elastomers. They are composed of rigid thermoplastic sequences connected via flexible elastomer sequences, for example polybutadiene, polyisoprene, poly(ethylene/butylene) or polyisobutylene. They are often triblock elastomers with two rigid segments connected via a flexible segment. The rigid and flexible segments can be positioned linearly, in star fashion or in branched fashion. Typically, each of these segments or blocks comprises at least more than 5, generally more than 10, base units (for example, styrene units and isoprene units for a styrene/isoprene/styrene block copolymer).

The number-average molecular weight (denoted $M_n$) of the thermoplastic polyisobutylene block elastomer (hereinafter abbreviated to "TPEI") is preferably between 30 000 and 500 000 g/mol, more preferably between 40 000 and 400 000 g/mol. Below the minima indicated, there is a risk of the cohesion between the chains of the TPEI being affected, in particular due to its possible dilution (in the presence of an extender oil); moreover, an increase in the operating temperature risks affecting the mechanical properties, in particular the properties at break, with a consequence of a reduced performance "under hot conditions". Furthermore, an excessively high weight $M_n$ can be damaging with regard to the flexibility of the gastight layer. Thus, it has been found that a value within a range from 50 000 to 300 000 g/mol is particularly well suited, in particular to use of the thermoplastic polyisobutylene block elastomer or TPEI in a pneumatic tyre composition.

The number-average molecular weight ($M_n$) of the TPEI is determined in a known way by size exclusion chromatography (SEC). The sample is dissolved beforehand in tetrahydrofuran at a concentration of approximately 1 g/l; the solution is then filtered through a filter with a porosity of 0.45 μm before injection. The equipment used is a "Waters alliance" chromatographic line. The elution solvent is tetrahydrofuran, the flow rate is 0.7 ml/min, the temperature of the system is 35° C. and the analytical time is 90 min. A set of four Waters columns in series, with "Styragel" trade names ("HMW7", "HMW6E" and two "HT6E"), is used. The injected volume of the solution of the polymer sample is 100 μl. The detector is a "Waters 2410" differential refractometer and its associated software for handling the chromatographic data is the "Waters Millennium" system. The calculated average molar masses are relative to a calibration curve produced with polystyrene standards.

The polydispersity index $I_p$ (it should be remembered that $I_p = M_w/M_n$ with $M_w$ the weight-average molecular weight) of the TPEI is preferably less than 3; more preferably $I_p$ is less than 2 and more preferably still less than 1.5.

The elastomer block is composed predominantly of the polymerized isobutylene monomer. Preferably, the polyisobutylene block of the block copolymer has a number-average molecular weight ("$M_n$") ranging from 25 000 g/mol to 350 000 g/mol, preferably from 35 000 g/mol to 250 000 g/mol, so as to confer, on the thermoplastic elastomer, good elastomeric properties and a mechanical strength which is sufficient and compatible with the pneumatic tyre inner liner application.

Preferably, the polyisobutylene block of the TPEI or block copolymer additionally has a glass transition temperature ("$T_g$") of less than or equal to −20° C., more preferably of less than −40° C. A $T_g$ value greater than these minima may reduce the performance of the airtight layer during use at very low temperature; for such a use, the $T_g$ of the polyisobutylene block of the block copolymer is more preferably still less than −50° C.

The polyisobutylene block of the TPEI can also advantageously comprise a content of units resulting from one or more conjugated dienes inserted into the polymer chain preferably ranging up to 16% by weight relative to the weight of the polyisobutylene block. Preferably the content ranges from 0.5% to 16%. Above 16%, a fall in the resistance to thermal oxidation and to oxidation by ozone may be observed for the airtight layer comprising the thermoplastic polyisobutylene block elastomer used in a tyre.

The conjugated dienes which can be copolymerized with the isobutylene in order to form the polyisobutylene block are conjugated $C_4$-$C_{14}$ dienes. Preferably, these conjugated dienes are selected from isoprene, butadiene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 1,3-hexadiene, 2-methyl-1,3-hexadiene, 3-methyl-1,3-hexadiene, 4-methyl-1,3-hexadiene, 5-methyl-1,3-hexadiene, 2,3-dimethyl-1,3-hexadiene, 2,4-dimethyl-1,3-hexadiene, 2,5-dimethyl-1,3-hexadiene, 2-neopentylbutadiene, 1,3-cyclopentadiene, 1,3-cyclohexadiene, 1-vinyl-1,3-cyclohexadiene or their mixture. More preferably, the conjugated diene is isoprene or a mixture containing isoprene.

The polyisobutylene block, according to an advantageous aspect of the subject of the invention, can be halogenated and can comprise halogen atoms in its chain. This halogenation makes it possible to improve the compatibility of the airtight layer with the other adjacent constituent components of the pneumatic object, in particular of a pneumatic tyre. Halogenation is carried out by means of bromine or chlorine, preferably bromine, on the units resulting from conjugated dienes of the polymer chain of the polyisobutylene block. Only a portion of these units reacts with the halogen.

According to a first embodiment, the TPEI is selected from styrene thermoplastic elastomers containing a polyisobutylene block ("TPSI").

The additional thermoplastic block or blocks of the polyisobutylene block (hereinafter denoted by "Additional Block") are thus composed of at least one polymerized monomer based on unsubstituted or substituted styrene; mention may be made, among substituted styrenes, for example, of methylstyrenes (for example, o-methylstyrene, m-methylstyrene or p-methylstyrene, α-methylstyrene, α,2-dimethylstyrene, α,4-dimethylstyrene or diphenylethylene), para-(tert-butyl)styrene, chlorostyrenes (for example, o-chlorostyrene, m-chlorostyrene, p-chlorostyrene, 2,4-dichlorostyrene, 2,6-dichlorostyrene or 2,4,6-trichlorostyrene), bromostyrenes (for example, o-bromostyrene, m-bromostyrene, p-bromostyrene, 2,4-dibromostyrene, 2,6-dibromostyrene or 2,4,6-tribromostyrene), fluorostyrenes (for example, o-fluorostyrene, m-fluorostyrene, p-fluorostyrene, 2,4-difluorostyrene, 2,6-difluorostyrene or 2,4,6-trifluorostyrene) or para-hydroxystyrene. Preferably, the TPSI thermoplastic elastomer is a polystyrene and polyisobutylene block copolymer.

Preferably, such a block copolymer is a styrene/isobutylene diblock copolymer (abbreviated to "SIB").

More preferably still, such a block copolymer is a styrene/isobutylene/styrene triblock copolymer (abbreviated to "SIBS").

According to a preferred embodiment of the invention, the weight content of styrene (unsubstituted or substituted) in the styrene elastomer is between 5% and 50%. Below the minimum indicated, the thermoplastic nature of the elastomer risks being substantially reduced, whereas, above the recommended maximum, the elasticity of the airtight layer may be affected. For these reasons, the styrene content is more preferably between 10% and 40%, in particular between 15% and 35%.

Preferably, the glass transition temperatures of the Additional Blocks formed from styrenic polymerized monomers are greater than or equal to 100° C., preferably greater than or equal to 130° C., more preferably still greater than or equal to 150° C., or even greater than or equal to 200° C.

The TPSI elastomer, optionally extended with a polybutene oil, is preferably the only constituent thermoplastic elastomer of the gastight elastomer layer matrix.

The TPSI elastomers can be processed conventionally, by extrusion or moulding, for example starting from a raw material available in the form of beads or granules.

The TPSI elastomers are available commercially, for example sold, as regards the SIB and SIBS, by Kaneka under the name "Sibstar" (e.g., "Sibstar 103T", "Sibstar 102T", "Sibstar 073T" or "Sibstar 072T" for the SIBSs or "Sibstar 042D" for the SIBs). They have, for example, been described, along with their synthesis, in the patent documents EP 731 112, U.S. Pat. Nos. 4,946,899 and 5,260,383. They were developed first of all for biomedical applications and then described in various applications specific to TPSI elastomers, as varied as medical equipment, motor vehicle or domestic electrical appliance parts, sheathings for electric wires, or airtight or elastic parts (see, for example, EP 1 431 343, EP 1 561 783, EP 1 566 405 and WO 2005/103146).

According to a second embodiment, the TPEI elastomers can also comprise at least one Additional Block formed from polymerized monomers other than styrene monomers (abbreviated to "TPNSI"). Such monomers can be selected from the following compounds and mixtures thereof:

acenaphthylene: a person skilled in the art may, for example, refer to the article by Z. Fodor and J. P. Kennedy, Polymer Bulletin, 1992, 29(6), 697-705;

indene and its derivatives, such as, for example, 2-methylindene, 3-methylindene, 4-methylindene, dimethylindenes, 2-phenylindene, 3-phenylindene and 4-phenylindene; a person skilled in the art may, for example, refer to the patent document U.S. Pat. No. 4,946,899 by the inventors Kennedy, Puskas, Kaszas and Hager and to the documents J. E. Puskas, G. Kaszas, J. P. Kennedy and W. G. Hager, Journal of Polymer Science, Part A: Polymer Chemistry (1992), 30, 41, and J. P. Kennedy, N. Meguriya and B. Keszler, Macromolecules (1991), 24(25), 6572-6577;

isoprene, then resulting in the formation of a number of trans-1,4-polyisoprene units and of units cyclized according to an intramolecular process; a person skilled in the art may, for example, refer to the documents G. Kaszas, J. E. Puskas and P. Kennedy, Applied Polymer Science (1990), 39(1), 119-144, and J. E. Puskas, G. Kaszas and J. P. Kennedy, Macromolecular Science, Chemistry A28 (1991), 65-80;

esters of acrylic acid, crotonic acid, sorbic acid and methacrylic acid, derivatives of acrylamide, derivatives of methacrylamide, derivatives of acrylonitrile, derivatives of methacrylonitrile and mixtures thereof. Mention may more particularly be made of adamantyl acrylate, adamantyl crotonate, adamantyl sorbate, 4-biphenylyl acrylate, tert-butyl acrylate, cyanomethyl acrylate, 2-cyanoethyl acrylate, 2-cyanobutyl acrylate, 2-cyanohexyl acrylate, 2-cyanoheptyl acrylate, 3,5-dimethyladamantyl acrylate, 3,5-dimethyladamantyl crotonate, isobornyl acrylate, pentachlorobenzyl acrylate, pentafluorobenzyl acrylate, pentachlorophenyl acrylate, pentafluorophenyl acrylate, adamantyl methacrylate, 4-(tert-butyl)cyclohexyl methacrylate, tert-butyl methacrylate, 4-(tert-butyl)phenyl methacrylate, 4-cyanophenyl methacrylate, 4-cyanomethylphenyl methacrylate, cyclohexyl methacrylate, 3,5-dimethyladamantyl methacrylate, dimethylaminoethyl methacrylate, 3,3-dimethylbutyl methacrylate, methacrylic acid, methyl methacrylate, ethyl methacrylate, phenyl methacrylate, isobornyl methacrylate, tetradecyl methacrylate, trimethylsilyl methacrylate, 2,3-xylenyl methacrylate, 2,6-xylenyl methacrylate, acrylamide, N-(sec-butyl)acrylamide, N-(tert-butyl)acrylamide, N,N-diisopropylacrylamide, N-(1-methylbutyl)acrylamide, N-methyl-N-phenylacrylamide, morpholylacrylamide, piperidylacrylamide, N-(tert-butyl)methacrylamide, 4-butoxycarbonylphenylmethacrylamide, 4-carboxyphenylmethacrylamide, 4-methoxycarbonylphenylmethacrylamide, 4-ethoxycarbonylphenylmethacrylamide, butyl cyanoacrylate, methyl chloroacrylate, ethyl chloroacrylate, isopropyl chloroacrylate, isobutyl chloroacrylate, cyclohexyl chloroacrylate, methyl fluoromethacrylate, methyl phenylacrylate, acrylonitrile, methacrylonitrile and mixtures thereof.

Preferably, the glass transition temperatures of these Additional Blocks formed from polymerized monomers other than styrene monomers are greater than or equal to 100° C., preferably greater than or equal to 130° C., more preferably still greater than or equal to 150° C., or even greater than or equal to 200° C.

According to one alternative form, the polymerized monomer other than a styrene monomer can be copolymerized with at least one other monomer so as to form a rigid thermoplastic block. According to this aspect, the molar fraction of polymerized monomer other than a styrene monomer, with respect to the total number of units of the thermoplastic block, must be sufficient to achieve a $T_g$ of greater than or equal to 100° C., preferably of greater than or equal to 130° C., more preferably still of greater than or equal to 150° C., or even of greater than or equal to 200° C. Advantageously, the molar fraction of this other comonomer can range from 0 to 90%, more preferably from 0 to 75% and more preferably still from 0 to 50%.

By way of illustration, this other monomer capable of copolymerizing with the polymerized monomer other than a styrene monomer can be selected from diene monomers, more particularly conjugated diene monomers having from 4 to 14 carbon atoms, and monomers of vinylaromatic type having from 8 to 20 carbon atoms.

When the comonomer is a conjugated diene having from 4 to 14 carbon atoms, it advantageously represents a molar fraction, with respect to the total number of units of the thermoplastic block, ranging from 0 to 25%. Suitable as conjugated dienes which can be used in the thermoplastic blocks according to one subject of the invention are those described above, namely isoprene, butadiene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 2,5-dimethyl-1,3-pentadiene, 1,3-hexadiene, 2-methyl-1,3-hexadiene, 3-methyl-1,3-hexadiene, 4-methyl-1,3-hexadiene, 5-methyl-1,3-hexadiene, 2,5-dimethyl-1,3-hexadiene, 2-neopentylbutadiene, 1,3-cyclopentadiene, 1,3-cyclohexadiene, 1-vinyl-1,3-cyclohexadiene or mixtures thereof.

When the comonomer is of vinylaromatic type, it advantageously represents a fraction of units, with regard to the total number of units of the Additional Block, from 0 to 90%, preferably ranging from 0 to 75% and more preferably still ranging from 0 to 50%. Suitable in particular as vinylaromatic compounds are the abovementioned styrene monomers, namely methylstyrenes, para-(tert-butyl)styrene, chlorostyrenes, bromostyrenes, fluorostyrenes or para-hydroxystyrene. Preferably, the comonomer of vinylaromatic type is styrene.

Mention may be made, as illustrative but nonlimiting examples, of mixtures of comonomers, which can be used for the preparation of Additional Blocks, composed of indene and of styrene derivatives, in particular para-methylstyrene or para-(tert-butyl)styrene. A person skilled in the art may then refer to the documents: J. E. Puskas, G. Kaszas, J. P. Kennedy and W. G. Hager, Journal of Polymer Science, Part A: Polymer Chemistry, 1992, 30, 41, or J. P. Kennedy, S. Midha and Y. Tsungae, Macromolecules (1993), 26, 429.

Preferably, a TPNSI thermoplastic elastomer is a diblock copolymer: thermoplastic block/isobutylene block. More preferably still, such a TPNSI thermoplastic elastomer is a triblock copolymer: thermoplastic block/isobutylene block/thermoplastic block.

Preparation of the TPNSI Thermoplastic Elastomers

The TPNSI thermoplastic elastomers as defined for the implementation of the invention may be prepared by methods of synthesis that are known per se and that are described in the literature. A person skilled in the art will know how to select the appropriate polymerization conditions and how to adjust the various parameters of the polymerization processes in order to arrive at the specific structural characteristics of the thermoplastic elastomer of use for the implementation of the invention.

Several synthesis strategies can be implemented with a view to preparing the copolymers according to the invention.

A first one consists of a first step of synthesis of the "polyisobutylene" block by living cationic polymerization of the monomers to be polymerized using a monofunctional, difunctional or polyfunctional initiator known to a person skilled in the art, followed by a second step of synthesis of the Additional Block(s) and by addition of the monomer to be polymerized to the living polyisobutylene obtained in the first step. Thus, these two steps are consecutive, which results in the sequential addition:

of the monomers to be polymerized for the preparation of the "polyisobutylene" block;
of the monomers to be polymerized for the preparation of the Additional Block(s).

In each step, the monomer(s) to be polymerized may or may not be added in the form of a solution in a solvent as described below, in the presence or absence of a Lewis acid or base as described below.

Each of these steps may be carried out in the same reactor, or in two different polymerization reactors. Preferably, these two steps are carried out in one and the same reactor ("one-pot" synthesis).

The living cationic polymerization is conventionally carried out using a difunctional or polyfunctional initiator and optionally a Lewis acid acting as a coinitiator in order to form, in situ, a carbocation. Customarily, electron-donor compounds are added in order to give the polymerization a living character.

By way of illustration, the difunctional or polyfunctional initiators that can be used for the preparation of the copolymers according to the invention may be selected from 1,4-di(2-methoxy-2-propyl)benzene (or "dicumyl methyl ether"), 1,3,5-tri(2-methoxy-2-propyl)-benzene (or "tricumyl methyl ether"), 1,4-di(2-chloro-2-propyl)benzene (or "dicumyl chloride"), 1,3,5-tri(2-chloro-2-propyl)benzene (or "tricumyl chloride"), 1,4-di(2-hydroxy-2-propyl)benzene, 1,3,5-tri(2-hydroxy-2-propyl)benzene, 1,4-di(2-acetoxy-2-propyl)-benzene, 1,3,5-tri(2-acetoxy-2-propyl)benzene, 2,6-dichloro-2,4,4,6-tetramethylheptane, 2,6-dihydroxy-2,4,4,6-heptane. Preferably, dicumyl ethers, tricumyl ethers, dicumyl halides or tricumyl halides are used.

The Lewis acids may be selected from metal halides of general formula $MX_n$ where M is an element selected from Ti, Zr, Al, Sn, P, B, and X is a halide such as Cl, Br, F or I and n corresponding to the degree of oxidation of the element M. Mention will be made, for example, of $TiCl_4$, $AlCl_3$, $BCl_3$, $BF_3$, $SnCl_4$, $PCl_3$, $PCl_5$. Among these compounds, preferably $TiCl_4$, $AlCl_3$ and $BCl_3$, and more preferably still $TiCl_4$, are used.

The electron-donor compounds may be selected from known Lewis bases, such as pyridines, amines, amides, esters, sulphoxides and others. Among these, DMSO (dimethylsulphoxide) and DMAc (dimethyl acetamide) are preferred.

The living cationic polymerization is carried out in an apolar inert solvent or in a mixture of apolar and polar inert solvents.

The apolar solvents that can be used for the synthesis of the copolymers according to the invention are, for example, aliphatic, cycloaliphatic or aromatic hydrocarbon-based solvents, such as hexane, heptane, cyclohexane, methylcyclohexane, benzene or toluene.

The polar solvents that can be used for the synthesis of the copolymers according to the invention are, for example, halogenated solvents such as alkane halides, for instance methyl chloride (or chloroform), ethyl chloride, butyl chloride, methylene chloride (or dichloromethane) or chlorobenzenes (mono-, di- or tri-chloro).

A person skilled in the art will know how to select the composition of the mixtures of monomers to be used in order to prepare the thermoplastic elastomeric block copolymers according to the invention and also the appropriate temperature conditions in order to achieve the molar mass characteristics of these copolymers.

By way of illustrative but nonlimiting example, and in order to implement this first synthesis strategy, a person skilled in the art will be able to refer to the following documents for the synthesis of a block copolymer based on isobutylene and on:

acenaphthylene: the article by Z. Fodor and P. Kennedy, Polymer Bulletin, 1992, 29(6), 697-705;

indene: the patent document U.S. Pat. No. 4,946,899 by the inventors Kennedy, Puskas, Kaszas and Hager and the documents J. E. Puskas, G. Kaszas, P. Kennedy and W. G. Hager, Journal of Polymer Science, Part A: Polymer Chemistry (1992), 30, 41, and J. P. Kennedy, N. Meguriya and B. Keszler, Macromolecules (1991), 24(25), 6572-6577;

isoprene: the documents G. Kaszas, J. E. Puskas and P. Kennedy, Applied Polymer Science (1990), 39(1), 119-144, and J. E. Puskas, G. Kaszas and J. P. Kennedy, Macromolecular Science, Chemistry A28 (1991), 65-80.

A second synthesis strategy consists in separately preparing:

a "polyisobutylene" block that is telechelic or functional at one or more of its chain ends by living cationic polymerization using a monofunctional, difunctional or polyfunctional initiator, optionally followed by a functionalization reaction on one or more of the chain ends;

the living Additional Block(s), for example by anionic polymerization;

then in reacting both of them in order to obtain a block copolymer of use for the implementation of the invention. The nature of the reactive functions at at least one of the chain ends of the "polyisobutylene" block and the proportion of living chains of the polymer constituting the Additional Block, relative to the amount of these reactive functions will be chosen by a person skilled in the art in order to obtain a block copolymer of use for the implementation of the invention.

A third synthesis strategy consists in carrying out, in this order:

the synthesis of a "polyisobutylene" block that is telechelic or functional at one or more of its chain ends by living cationic polymerization using a monofunctional, difunctional or polyfunctional initiator;

the chain-end modification of this "polyisobutylene" so as to introduce a monomer unit that can be lithiated;

optionally, the supplementary addition of a monomer unit that can be lithiated and can result in a species capable of initiating an anionic polymerization, such as for example 1,1-diphenylethylene;

finally, the addition of the polymerizable monomer and of optional comonomers via an anionic route.

By way of example, for the use of such a synthesis strategy, a person skilled in the art may refer to the communication from Kennedy and Price, ACS Symposium, 1992, 496, 258-277 or to the article by Faust et al.: Facile synthesis of diphenylethylene end-functional polyisobutylene and its applications for the synthesis of block copolymers containing poly(methacrylate)s, by Dingsong Feng, Tomoya Higashihara and Rudolf Faust, Polymer, 2007, 49(2), 386-393).

The halogenation of the copolymer according to the invention is carried out according to any method known to those skilled in the art, especially those used for the halogenation of butyl rubber, and may take place, for example, using bromine or chlorine, preferentially bromine, on the conjugated diene-based units of the polymer chain of the "polyisobutylene" block and/or of the thermoplastic block(s).

In certain variants of the invention according to which the thermoplastic elastomer is a star or branched elastomer, the processes described, for example, in the articles by Puskas, J. Polym. Sci. Part A: Polymer Chemistry, vol. 36, pp 85-92 (1998) and Puskas, J. Polym. Sci. Part A: Polymer Chemistry, vol. 43, pp 1811-1826 (2005) may be performed by analogy in order to obtain star, branched or living dendrimer "polyisobutylene" blocks.

A person skilled in the art will then know how to select the composition of the mixtures of monomers to be used in order to prepare the copolymers according to the invention and also the appropriate temperature conditions in order to achieve the molar mass characteristics of these copolymers.

Preferably, the copolymers according to the invention will be prepared by living cationic polymerization using a difunctional or polyfunctional initiator and by sequential additions of the monomers to be polymerized for the synthesis of the "polyisobutene" block and of the monomers to be polymerized for the synthesis of the Additional Block(s).

The TPSI or TPNSI block thermoplastic elastomer according to the invention as defined previously may by itself constitute the matrix of the elastomeric composition or may be combined, in this composition, with other constituents in order to form an elastomeric matrix.

If other optional elastomers are used in this composition, the block copolymer as described previously constitutes the predominant elastomer by weight, i.e., the weight fraction of the block copolymer relative to all of the constituent elastomers of the elastomer matrix is the highest. The block copolymer preferably represents more than 50% and more preferably more than 70% by weight of all of the elastomers. Such additional elastomers may, for example, be diene elastomers or thermoplastic styrene (TPS) elastomers, within the limit of the compatibility of their microstructures As diene elastomers that can be used in addition to the block copolymer described previously, mention may be made especially of polybutadienes (BR), synthetic to polyisoprenes (IR), natural rubber (NR), butadiene copolymers, isoprene copolymers and mixtures of these elastomers. Such copolymers are more preferably selected from the group consisting of butadiene-styrene copolymers (SBR), isoprene-butadiene copolymers (BIR), isoprene-styrene copolymers (SIR), isoprene-isobutylene copolymers (IIR) and halogenated versions thereof, isoprene-butadiene-styrene copolymers (SBIR), and mixtures of such copolymers.

As TPE thermoplastic elastomer that can be used in addition to the block copolymer described previously, mention may be made especially of a TPS elastomer selected from the group consisting of styrene/butadiene/styrene (SBS) block copolymers, styrene/isoprene/styrene (SIS) and styrene/butylene/styrene block copolymers, styrene/butadiene/isoprene/styrene (SBIS) block copolymers, styrene/ethylene/butylene/styrene (SEBS) block copolymers, styrene/ethylene/propylene/styrene (SEPS) block copolymers, styrene/ethylene/ethylene/propylene/styrene (SEEPS) block copolymers, styrene/ethylene/ethylene/styrene (SEES) block copolymers, and mixtures of these copolymers. More preferably, said optional additional TPS elastomer is selected from the group consisting of SEBS block copolymers, SEPS block copolymers and mixtures of these copolymers.

II-1-B. Thermoplastic Material

An essential feature of the airtight layer of the pneumatic object or inflatable article according to the invention is that of comprising hot-melt polymer microdomains or microparticles.

The term "microdomain" or "microparticle" is understood, by definition and generally, to mean microdomains or microparticles of micrometer size (i.e., largest dimension in the case of anisometric particles), i.e., the number-average size of which is preferably between 0.5 µm and 500 µm. Very preferably, the number-average size is between 1 µm and 50 µm. A procedure for determining this number-average size from scanning electron microscopy images is described below.

These microdomains are polymeric, i.e., they consist of at least one polymer and they are hot-melt, i.e., by the action of the temperature, their viscosity decreases greatly; the material that forms them has a melting temperature or a softening temperature.

These microdomains are based on at least one thermoplastic material different from the thermoplastic polyisobutylene block polymer constituting the matrix of the composition of the airtight layer.

The melting temperature of a crystalline thermoplastic material is determined by differential scanning calorimetry (DSC) according to the ISO 11357 standard.

It is recalled that the softening point or temperature is the temperature at which the material, for example in powder form, cakes together. The softening point or temperature of a thermoplastic material is measured according to the ISO 4625 standard ("ring and ball" method).

The hot-melt polymer microdomains have the advantage of reinforcing the gastightness of the airtight elastomer layer. These hot-melt polymer microdomains are obtained during the manufacture of the airtight elastomer layer. This airtight elastomer layer is produced with an extrusion tool, for example with a twin-screw extruder. In the body of the extrusion tool, the thermoplastic polyisobutylene block elastomer, constituting the matrix of the airtight elastomer layer, and the thermoplastic material constituting these hot-melt polymer microdomains are melted and then kneaded. After the resulting mixture has cooled, the presence of these microdomains is observed.

An essential feature of the airtight elastomer layer is that of comprising hot-melt polymer microdomains or microparticles. The thermoplastic material constituting these microdomains has a structure such that, after melt-kneading with the thermoplastic polyisobutylene block elastomer of the matrix and cooling, microdomains can be observed, for example via scanning electron microscopy (see FIG. 3); this observation illustrates the, at least partial, incompatibility of the two materials.

The thermoplastic material also has the following preferred features:
  its melting or softening temperature is greater than 100° C., preferably greater than 140° C. and very preferably between 170° C. and 300° C., in order to enable the generation of the microdomains during the production of the airtight elastomer layer;
  its air permeability at 60° C. is less than $3 \times 10^{-17}$ $m^4.N^{-1}.s^{-1}$, preferably less than $10^{-18}$ $m^4.N^{-1}.s^{-1}$ and very preferably less than $10^{-19}$ $m^4.N^{-1}.s^{-1}$, in order to substantially improve the airtightness of the airtight elastomer composition.

Preferably, the thermoplastic material of the hot-melt polymer microdomains is selected from the group consisting of polyolefins, chlorinated vinyl polymers, polystyrenes, polyamides, polyesters, copolymers of ethylene and vinyl alcohol (EVOH), polyacrylates, polyacetals, thermoplastic polyurethane (TPU) elastomers, copolyesters (COPEs), and mixtures thereof.

Preferably, the polyolefins are selected from polyethylenes and polypropylenes.

Preferably, the chlorinated vinyl polymers are selected from polyvinyl chlorides (PVCs), polyvinylidene chlorides (PVDCs), chlorinated polyvinyl chlorides (CPVCs) and mixtures thereof.

Preferably, the polyesters are selected from polyethylene terephthalates (PETs), polybutylene terephthalates (PBTs), polycarbonates (PCs) and polyethylene naphthalates (PENs) and mixtures thereof.

The polyamides may be selected from aliphatic polyamides and preferably from polyamides 6, polyamides 6-6, polyamides 11 and mixtures thereof.

Preferably, the copolyesters (COPEs) are selected from poly(ester-ether)s and poly(ester-ester)s.

An example of a polyacrylate is polymethyl methacrylate (PMMA); an example of a polyacetal is polymethylene oxide (POM).

Preferably, in the airtight elastomer composition, the thermoplastic material constituting hot-melt polymer microdomains is at a volume content of 3% to 50% of the airtight elastomer composition, preferably 5% to 40% by volume and very preferably 10% to 40% by volume.

Below 3% by volume, the effect of the thermoplastic microdomains is insufficient and above 50% by volume, there is a risk of observing a phase inversion between the elastomeric matrix and the thermoplastic, which results in a very high increase in rigidity.

II-1-C. Extender Oil

The thermoplastic polyisobutylene block elastomers and the hot-melt polymer to microdomains based on a thermoplastic material that are described above are sufficient by themselves alone to fulfil the function of gastightness with regard to the inflatable articles in which they are used.

However, according to a preferred embodiment of the invention, the elastomer composition described above also comprises, as a plasticizing agent, an extender oil (or plasticizing oil), the role of which is to facilitate the processing of the gastight layer, particularly its incorporation in the pneumatic object, by a lowering of the modulus and an increase in the tackifying power.

Use may be made of any extender oil, preferably having a weakly polar nature, capable of extending or plasticizing elastomers, in particular thermoplastic elastomers. At ambient temperature (23° C.), these oils, which are more or less viscous, are liquids (that is to say, to recapitulate, substances having the ability to eventually assume the shape of their container), in contrast in particular to resins or rubbers, which are solids by nature.

Preferably, the extender oil is selected from the group consisting of polyolefin oils (that is to say, resulting from the polymerization of olefins, monoolefins or diolefins), paraffinic oils, naphthenic oils (of low or high viscosity), aromatic oils, mineral oils and mixtures of these oils.

While it has been found that the addition of oil admittedly takes place at the cost of a certain loss in airtightness, which can vary according to the type and the amount of oil used, this loss in airtightness can be largely mitigated by adjusting the content of the microdomain-based thermoplastic material.

Use is preferably made of an oil of polybutene type, in particular a polyisobutylene oil (abbreviated to "PIB"), which has demonstrated the best compromise in properties in comparison with the other oils tested, in particular with a conventional oil of the paraffinic type.

By way of examples, polyisobutylene oils are sold in particular by Univar under the name "Dynapak Poly" (e.g., "Dynapak Poly 190"), by Ineos Oligomer under the name "Indopol H1200" or by BASF under the names "Glissopal" (e.g., "Glissopal 1000") or "Oppanol" (e.g., "Oppanol B12"); paraffinic oils are sold, for example, by Exxon under the name "Telura 618" or by Repsol under the name "Extensol 51".

The number-average molecular weight ($M_n$) of the extender oil is preferably between 200 and 25 000 g/mol and more preferably still between 300 and 10 000 g/mol. For excessively low $M_n$ weights, there exists a risk of migration of the oil outside the composition, whereas excessively high weights can result in excessive stiffening of this composition. A $M_n$ weight of between 350 and 4000 g/mol, in particular between 400 and 3000 g/mol, has proved to constitute an excellent compromise for the target applications, in particular for use in a pneumatic tyre.

The number-average molecular weight ($M_n$) of the extender oil is determined by SEC, the sample being dissolved beforehand in tetrahydrofuran at a concentration of approximately 1 g/l; the solution is then filtered through a filter with a porosity of 0.45 µm before injection. The equipment is the "Waters Alliance" chromatographic line. The elution solvent is tetrahydrofuran, the flow rate is 1 ml/min, the temperature of the system is 35° C. and the analytic time is 30 min. Use is made of a set of two "Waters" columns bearing the name "Styragel HT6E". The injected volume of the solution of the polymer sample is 100 µl. The detector is a "Waters 2410" differential refractometer and its associated software for handling the chromatographic data is the "Waters Millennium" system. The calculated average molar masses are relative to a calibration curve produced with polystyrene standards.

A person skilled in the art will know how, in the light of the description and exemplary embodiments which follow, to adjust the amount of extender oil as a function of the specific conditions of use of the gastight elastomer layer, in particular of the pneumatic object in which it is intended to be used.

It is preferable for the content of extender oil to be greater than 5 parts by weight per hundred parts of thermoplastic polyisobutylene block elastomer, preferably between 5 and 150 parts.

Below the minimum indicated, the presence of extender oil is not noticeable. Above the recommended maximum, the risk is encountered of insufficient cohesion of the composition and of loss in airtightness which may be harmful depending on the application under consideration.

For these reasons, in particular for use of the airtight composition in a pneumatic tyre, it is preferable for the content of extender oil to be greater than 10 parts, in particular between 10 and 130 parts, more preferably still for it to be greater than 20 parts, in particular between 20 and 100 parts.

II-1-D. Platy Filler

To further increase the airtightness of the airtight elastomer layer, use may be made of a platy filler. The optional use of a platy filler advantageously makes it possible to lower the permeability coefficient (and thus to increase the airtightness) of the elastomer composition without excessively increasing its modulus, which makes it possible to retain the ease of incorporation of the airtight layer in the pneumatic object.

"Platy" fillers are well known to a person skilled in the art. They have been used in particular in pneumatic tyres to reduce the permeability of conventional gastight layers based on butyl rubber. They are generally used in these butyl-based layers at relatively low contents not exceeding generally from 10 to 15 parts by weight per hundred parts of elastomer (phr), (see, for example, the patent documents US 2004/0194863 and WO 2006/047509).

They are generally provided in the form of stacked plates, platelets, sheets or lamellae, with a more or less marked anisometry. Their aspect ratio (A=L/T) is generally greater than 3, more often greater than 5 or than 10, L representing the length (or greatest dimension) and T representing the average thickness of these platy fillers, these averages being calculated as number averages. Aspect ratios reaching several tens, indeed even several hundreds, are common. Their average length is preferably greater than 1 µm (that is to say that "micrometer-sized" platy fillers are then involved), typically between several µm (for example 5 µm) and several hundred µm (for example 500 µm, indeed even 800 µm).

Preferably, the platy fillers used are selected from the group consisting of graphites, phyllosilicates and the mixtures of such fillers. Mention will in particular be made, among phyllosilicates, of clays, talcs, micas or kaolins, it being possible for these phyllosilicates to be unmodified or to be modified, for example by a surface treatment; mention may in particular be made, as examples of such modified phyllosilicates, of micas covered with titanium oxide or clays modified by surfactants ("organo clays").

Use is preferably made of platy fillers having a low surface energy, that is to say which are relatively apolar, such as those selected from the group consisting of graphites, talcs, micas and the mixtures of such fillers, it being possible for the latter to be modified or unmodified, more preferably still selected from the group consisting of micas and the mixtures of such fillers.

Mention may in particular be made, among graphites, of natural graphites, expanded graphites or synthetic graphites.

Mention may be made, as examples of talcs, of the talcs sold by Luzenac.

Mention may be made, as examples of graphites, of the graphites sold by Timcal ("Timrex" range).

Mention may be made, as examples of micas, of the micas sold by CMMP ("Mica-MU", "Mica-Soft" and "Briomica", for example), the micas sold by Yamaguchi (A51S, A41S, SYA-21R, SYA-21RS, A21S and SYA-41R), vermiculites (in particular the vermiculite "Shawatec" sold by CMMP or the vermiculite "Microlite" sold by W.R. Grace) or modified or treated micas (for example, the "Iriodin" range sold by Merck).

The platy fillers described above can be used, in a manner complementary to the hot-melt polymer microdomains, at variable contents, in particular between 2 and 20% by volume of elastomer composition.

The introduction of the platy fillers into the thermoplastic elastomer composition can be carried out according to various known processes, for example by twin-screw extrusion.

It is particularly interesting to note that during the introduction of the platy fillers into a thermoplastic block elastomer in the liquid state, the shear stresses in the composition are significantly reduced and only very slightly modify the size distributions and the initial aspect ratio of the platy fillers.

II-1-E. Various Additives

The airtight layer or composition described above can furthermore comprise the various additives normally present in the airtight layers known to a person skilled in the art. Mention will be made, for example, of reinforcing fillers, such as carbon black or silica, non-reinforcing or inert fillers other than the fillers described above, colouring agents which can advantageously be used for the colouring of the composition, plasticizers other than the abovementioned extender oils, tackifying resins, protecting agents, such as antioxidants or antiozonants, UV stabilizers, various processing aids or other stabilizing agents, or promoters capable of promoting the adhesion to the remainder of the structure of the pneumatic object.

The gastight layer or composition described above is a compound that is solid (at 23° C.) and elastic, which is characterized in particular, owing to its specific formulation, by a very high flexibility and very high deformability.

II-2. Manufacture of the Airtight Elastomer Composition

The manufacture of the airtight elastomer composition is advantageously carried out using an extrusion tool, preferably with a twin-screw extruder. Such an extruder makes it possible to obtain both the melting of the thermoplastic constituents of the composition and the intimate kneading thereof.

$T_{M1}$ is considered to be the given melting or softening temperature of the thermoplastic polyisobutylene block elastomer and $T_{M2}$ the given melting or softening temperature of the thermoplastic material.

The manufacturing process comprises the following steps:
  introducing the thermoplastic elastomer and the thermoplastic material into the feed(s) of the twin-screw extruder;
  melting and kneading the constituents by bringing all the constituents to a kneading temperature ($T_M$) above both the given melting or softening temperatures ($T_{M1}$, $T_{M2}$) during the transfer into the body of the twin-screw extruder; and
  dispensing the resulting composition at the outlet of the twin-screw extruder with a die of suitable cross section.

The body of the twin-screw extruder is brought to a temperature $T_M$ above the two melting or softening temperatures of the thermoplastic components of the composition. This makes it possible to carry out, during the transfer of the constituents into the body of the extruder, both the melting of the two thermoplastic constituents and the kneading thereof.

The difference in temperature must be greater than 5° C. in order for the melting to be complete, and is preferably greater than 10° C.

At the outlet of the twin-screw extruder it is possible to install a die having a cross section suitable for the intended use of the airtight elastomer layer. For example, a sheet die in order to obtain a flat profiled element ready to be introduced into the blank of the pneumatic tyre.

At the outlet of the die, as is well known to those skilled in the art, the profiled element may be received by a protective liner placed on a moving belt and then stored in the form of a reel.

The thermoplastic polyisobutylene block elastomer and the thermoplastic material may be introduced at the same time into the body of the extruder by means of one and the same feed.

It is also possible to introduce, at the same time or subsequently, the optional extender oil of the elastomer and the optional additives.

The process for manufacturing the airtight elastomer layer has the essential feature of kneading the two thermoplastic constituents in the melt state. This makes it possible to obtain hot-melt polymer microdomains or microparticles of suitable sizes and distribution.

II-3. Use of the Airtight Layer in a Pneumatic Tyre

The composition based on thermoplastic elastomer described above can be used as airtight layer in any type of pneumatic object or inflatable article. Mention may be made, as examples of such pneumatic objects or inflatable articles, of inflatable boats, or balloons or balls used for play or sport.

It is particularly well suited to use as an airtight layer (or layer airtight to any other inflation gas, for example nitrogen) in a pneumatic object, finished product or semi-finished product made of rubber, very particularly in a pneumatic tyre for a motor vehicle, such as a vehicle of two-wheel, passenger or industrial type.

Such an airtight layer is preferably positioned on the internal wall of the pneumatic object, but it can also be fully incorporated in its internal structure.

The thickness of the airtight layer is preferably greater than 0.05 mm, more preferably between 0.1 mm and 10 mm (in particular between 0.1 and 1.0 mm).

It will be easily understood that, depending on the specific fields of application, the dimensions and the pressures at work, the embodiment of the invention can vary, the airtight layer then having several preferred thickness ranges.

Thus, for example, for pneumatic tyres of passenger vehicle type, it can have a thickness of at least 0.4 mm, preferably of between 0.8 and 2 mm. According to another example, for pneumatic tyres for heavy-duty or agricultural vehicles, the preferred thickness can be between 1 and 3 mm. According to another example, for pneumatic tyres for vehicles in the civil engineering field or for aircraft, the preferred thickness can be between 2 and 10 mm.

In comparison with an airtight layer as disclosed in the document WO 2009/007064 A1, the airtight layer according to the invention has the advantage of being less expensive, less dense, easier to produce and finally of having an improved crack resistance and breaking strength while retaining a gastightness which is at least equal.

III. EXEMPLARY EMBODIMENTS OF THE INVENTION

The gastight layer described above can advantageously be used in pneumatic tyres for all types of vehicles, in particular passenger vehicles or industrial vehicles, such as heavy-duty vehicles.

By way of example, appended FIG. 1 represents, highly schematically (not to a specific scale), a radial cross section of a pneumatic tyre in accordance with the invention.

This pneumatic tyre 1 comprises a crown 2 reinforced by a crown reinforcement or belt 6, two sidewalls 3 and two beads 4, each of these beads 4 being reinforced with a bead wire 5. The crown 2 is surmounted by a tread not represented in this schematic figure. A carcass reinforcement 7 is wound around the two bead wires 5 in each bead 4, the turn-up 8 of this reinforcement 7 being, for example, positioned towards the outside of the tyre 1, which is here represented fitted on its rim 9. The carcass reinforcement 7 is, in a way known per se, composed of at least one ply reinforced by "radial" cords, for example textile or metal cords, that is to say that these cords are positioned virtually parallel to one another and extend from one bead to the other, so as to form an angle of between 80° and 90° with the median circumferential plane (plane perpendicular to the axis of rotation of the tyre which is situated at mid-distance from the two beads 4 and passes through the middle of the crown reinforcement 6).

The internal wall of the pneumatic tyre 1 comprises an airtight layer 10, for example with a thickness equal to approximately 0.9 mm, on the side of the internal cavity 11 of the pneumatic tyre 1.

This inner layer (or "inner liner") covers the whole of the internal wall of the pneumatic tyre, extending from one sidewall to the other, at least up to the level of the rim flange when the pneumatic tyre is in the fitted position. It defines the radially internal face of said tyre intended to protect the carcass reinforcement from the diffusion of air originating from the space 11 interior to the tyre. It enables the pneumatic tyre to be inflated and kept under pressure. Its airtightness properties must allow it to guarantee a relatively low degree of pressure loss and to keep the tyre inflated, in the normal operating state, for a sufficient period of time, normally of several weeks or several months.

Unlike a conventional pneumatic tyre that uses a composition based on butyl rubber, the pneumatic tyre according to the invention uses, in this example, as the airtight layer 10, an elastomer composition comprising a SIBS elastomer ("Sibstar 102T" with a styrene content of approximately 15%, a $T_g$ of the polyisobutylene block of approximately −65° C. and an $M_n$ of approximately 90 000 g/mol), and a thermoplastic material (for example, 10% by volume of "Amite A06101" PET), this composition being extended here with a PIB oil (for example, 67 parts of "H-1200 INEOS" oil).

The tyre provided with its airtight layer 10 as described above may be produced before or after vulcanization (or curing).

In the first case (i.e., before curing of the pneumatic tyre), the airtight layer is simply applied in a conventional manner at the desired place, so as to form the layer 10. The vulcanization is then carried out conventionally.

An advantageous variant of manufacture for a person skilled in the art of pneumatic tyres consists, for example, during a first step, in laying down, flat, the airtight layer directly on a building drum, in the form of a layer ("skim") of suitable thickness, before covering the latter with the remainder of the structure of the pneumatic tyre, according to manufacturing techniques well known to a person skilled in the art.

In the second case (i.e., after curing of the pneumatic tyre), the airtight layer is applied to the inside of the cured pneumatic tyre by any appropriate means, for example by bonding, by spraying or else extrusion and direct application of a profiled element of suitable thickness.

III-1. Tests

A Airtightness Test

In the following examples the airtightness properties were analysed on test specimens of compositions based on thermoplastic elastomer (with and without hot-melt polymer microdomains and platy filler).

Use was made, for this analysis, of a rigid-wall permeameter, placed in an oven (temperature at 60° C. in the present case), equipped with a relative pressure sensor (calibrated in the range from 0 to 6 bar) and connected to a tube equipped with an inflation valve. The permeameter can receive standard test specimens in disc form (for example, with a diameter of 65 mm in the present case) and with a uniform thickness which can range up to 3 mm (0.5 mm in the present case). The pressure sensor is connected to a National Instruments data acquisition card (0-10 V analogue four-channel acquisition) which is connected to a computer carrying out continuous acquisition with a frequency of 0.5 Hz (1 point every two seconds). The permeability coefficient (K) is measured from the linear regression line giving the slope a of the pressure loss through the test specimen tested as a function of the time, after stabilization of the system, that is to say the achievement of stable conditions under which the pressure decreases linearly as a function of the time. The initial measurement pressure is, for example, between 4 and 3.4 bar.

B Microscope Observations

Microscope observations were carried out with a scanning electron microscope in order to determine the presence of particles and their size.

The samples were subjected to a mechanical cutting and were not metallized. The photographs presented were taken by an FEI brand, Quanta model, 400F series environmental microscope with an acceleration voltage (HV) of 9 kV using an electron backscatter detector.

The photographs were processed with Analysis Pro 5.0 software following a protocol known to a person skilled in the art aiming to increase the contrast and decrease the noise.

The protocol is the following:
Application of the Sigma filter to eliminate noise (pixel smoothing);
Application of the DCE filter to bring out the contrasts;
Re-application of the Sigma filter;
Binarization of the image in order to identify the contours of the filler (conversion from greyscale to black and white);
Application of the morphological opening filter to eliminate the single pixels;
Application of a 1 pixel cut-off;
Application of the average DCE.

The result of the analysis is a value of the number-average size of particles in μm.

C Failure Test

Tensile tests at break were carried out on ASTM C test specimens, at ambient temperature. The results correspond to the nominal stress at break and elongation at break.

III-2. Tests

EXAMPLE I

Two gastight compositions containing the components presented in Table 1 were prepared in a conventional manner by incorporating the various components into a twin-screw extruder, so as to achieve the melting of the matrix and of the thermoplastic material constituting the thermoplastic microdomains and also an incorporation of all the ingredients. A sheet die at the outlet of the extruder made it possible to shape a profiled element deposited on a liner.

The two compositions comprise the same elastomer matrix (SIBS extended with PIB oil). The first additionally comprises a platy filler at a volume content of 10%, the second an "Amite A06 101" polyester terephthalate (PET) from DSM Plastic Engineering at the same volume content of 10%. The melting temperature of this polyester is 255° C.

For the first composition, the temperature of the body of the extruder is adjusted to 250° C., for the second this temperature is 270° C., i.e., 15° C. above the melting temperature of the PET in order to perform the kneading in the melt state.

The formulations and their test results are indicated in Table 1 below. The plasticizer contents are expressed in phr, the contents of platy filler or of thermoplastic material in % by volume (relative to the total volume of the TPS elastomer composition) and also in phr (relative to the weight of SIBS elastomer). The term "phr" is understood here to mean parts by weight per 100 parts by weight of SIBS elastomer.

TABLE 1

| | Composition No. | |
|---|---|---|
| | I-1 | I-2 |
| SIBS - Sibstar 102 T - KANEKA - (phr) | 100 | 100 |
| PIB oil H1200 - INEOS - (phr) | 67 | 67 |
| SYA41R YAMAGUCHI - % by volume (phr) | 10 (57.4) | |
| PET Arnite A06101 - DSM Engineering Plastics - % by volume (phr) | | 10 (27) |
| relative airtightness ($K_0/K$) | 100 | 42 |
| stress at break (relative to a base 100) | 100 | 185 |
| elongation at break (relative to a base 100) | 100 | 370 |
| number-average size of the particles of fillers/thermoplastic microdomains (μm) | 42 | 1.9 |

The density of the SIBS is 0.92 g/cm³, that of the PIB oil is 0.89 g/cm³, that of the PET is 1.34 g/cm³, and that of the mica SYA41R is 1.45 g/cm³.

FIGS. 2 and 3 present a microscope observation of a sample of composition I-1 (FIG. 2) and of composition 1-2 (FIG. 3). The presence in FIG. 3 of numerous microdomains or microparticles having a number-average size of the order of 2 μm is firstly observed. This confirms that the PET is indeed incompatible with the SIBS elastomer and that there is phase separation between the PET and the elastomer matrix and creation of these microdomains. These microdomains are spherical. It is therefore understandable that, at the same volume content, the permeability of the composition with the PET thermoplastic microdomains is higher than that comprising the platy fillers of very high aspect ratio (see FIG. 2) (tortuosity effect).

On the other hand, a very substantial improvement of the properties at break of composition I-2 relative to I-1 is observed, since the stress at break has changed from 100 to 184 and the deformation at break from 100 to 370.

EXAMPLE II

TABLE 2

| | Composition No. | | | | |
|---|---|---|---|---|---|
| | C-1 | C-2 | C-3 | C-4 | C-5 |
| Butyl elastomer (1) | 100 | | | | |
| SIBS - Sibstar 102T | | 100 | 100 | 100 | 100 |
| Carbon black (N772) (phr) | 50 | | | | |
| PIB oil - INDOPOL H1200 (phr) | | 67 | 25 | 67 | 25 |
| zinc oxide (phr) | 1.5 | | | | |
| stearic acid (phr) | 1.5 | | | | |
| accelerator (2) (phr) | 1.2 | | | | |
| sulphur (phr) | 1.5 | | | | |
| PET - Arnite A06101 % by volume (phr) | | | | 40 (162) | |
| PET - Arnite A06300 % by volume (phr) | | | | | 30 (77.2) |
| relative airtightness ($K_0/K$) | 100.0 | 77.2 | 81.8 | 116 | 131 |

(1): brominated polyisobutylene "BROMOBUTYL 3220" sold by Exxon Chemical Co.;
(2): 2-mercaptobenzothiazyl disulphide, MBTS.

This second example shows the effectiveness of the presence of thermoplastic microdomains as described for reinforcing the airtightness of a composition based on a SIBS thermoplastic elastomer.

This example comprises three reference compositions: C-1 corresponds to a standard formulation of inner liner based on butyl rubber, C-2 and C-3 to the SIBS thermoplastic elastomer matrix extended respectively with 67 parts and 25 parts of PIB oil. The airtightness of the extended matrix is approximately 20% to 30% lower than that of a standard inner liner.

In comparison with composition C-2, composition C-4 shows that the addition of PET thermoplastic makes it possible to very markedly improve the airtightness of the composition and even to obtain a performance significantly superior to that of standard inner liners.

The same change is found for composition C-5 compared to composition C-3, for which the content of PIB oil is lower and in which a different grade of PET was studied.

The invention claimed is:

1. An inflatable article comprising an airtight elastomer layer composition, wherein the airtight elastomer layer composition includes:
    a thermoplastic polyisobutylene block elastomer as a sole elastomer or as a predominant elastomer by weight, the thermoplastic polyisobutylene block elastomer being composed of rigid thermoplastic sequences connected via flexible elastomer sequences, and
    hot-melt polymer microdomains comprising a thermoplastic material,
    wherein the thermoplastic material of the hot-melt polymer microdomains is at a volume content of 3% to 50% of the airtight elastomer layer composition.

2. The inflatable article according to claim 1, wherein the thermoplastic material of the hot-melt polymer microdomains is selected from the group consisting of polyolefins, chlorinated vinyl polymers, polystyrenes, polyamides, polyesters, copolymers of ethylene and vinyl alcohol (EVOH), polyacrylates, polyacetals, thermoplastic polyurethane (TPU) elastomers, copolyesters (COPEs), and mixtures thereof.

3. The inflatable article according to claim 2, wherein the polyolefins are selected from the group consisting of polyethylenes and polypropylenes.

4. The inflatable article according to claim 2, wherein the chlorinated vinyl polymers are selected from the group consisting of polyvinyl chlorides (PVCs), polyvinylidene chlorides (PVDCs), chlorinated polyvinyl chlorides (CPVCs), and mixtures thereof.

5. The inflatable article according to claim 2, wherein the polyesters are selected from the group consisting of polyethylene terephthalates (PETs), polybutylene terephthalates (PBTs), polycarbonates (PCs) and polyethylene naphthalates (PENs), and mixtures thereof.

6. The inflatable article according to claim 2, wherein the polyamides are aliphatic polyamides.

7. The inflatable article according to claim 6, wherein the aliphatic polyamides are selected from the group consisting of polyamide 6, polyamide 6-6, polyamide 11, and mixtures thereof.

8. The inflatable article according to claim 2, wherein the copolyesters (COPEs) are selected from the group consisting of poly(ester-ether)s and poly(ester-ester)s.

9. The inflatable article according to claim 1, wherein the hot-melt polymer microdomains have a number-average size between 0.5 and 500 μm.

10. The inflatable article according to claim 9, wherein the hot-melt polymer microdomains have a number-average size between 1 and 50 μm.

11. The inflatable article according to claim 1, wherein a number-average molecular weight of the thermoplastic polyisobutylene block elastomer is between 30,000 and 500,000 g/mol.

12. The inflatable article according to claim 1, wherein a polyisobutylene block of the thermoplastic polyisobutylene block elastomer includes units resulting from one or more conjugated dienes inserted into a polymer chain ranging from 0.5% to 16% by weight relative to a weight of the polyisobutylene block.

13. The inflatable article according to claim 1, wherein the thermoplastic polyisobutylene block elastomer includes a thermoplastic block with a polymerized monomer selected from the group consisting of styrene, methylstyrenes, para-(tert-butyl)styrene, chlorostyrenes, bromostyrenes, fluorostyrenes, para-hydroxystyrene, acenaphthylene, indene, 2-methylindene, 3-methylindene, 4-methylindene, dimethylindenes, 2-phenylindene, 3-phenylindene, 4-phenylindene, isoprene, esters of acrylic acid, crotonic acid, sorbic acid and methacrylic acid, derivatives of acrylamide, derivatives of methacrylamide, derivatives of acrylonitrile, and derivatives of methacrylonitrile.

14. The inflatable article according to claim 13, wherein the polymerized monomer is selected from the group consisting of styrene, methylstyrenes, para-(tert-butyl)styrene, chlorostyrenes, bromostyrenes, fluorostyrenes, and para-hydroxystyrene.

15. The inflatable article according to claim 14, wherein the thermoplastic polyisobutylene block elastomer is selected from the group consisting of styrene/isobutylene diblock copolymers (SIBS) and styrene/isobutylene/styrene triblock copolymers (SIBSs).

16. The inflatable article according to claim 15, wherein the thermoplastic polyisobutylene block elastomer is a styrene/isobutylene/styrene (SIBS).

17. The inflatable article according to claim 13, wherein the polymerized monomer is selected from the group consisting of acenaphthylene, indene, 2-methylindene, 3-methylindene, 4-methylindene, dimethylindenes, 2-phenylindene, 3-phenylindene, 4-phenylindene, isoprene, esters of acrylic acid, crotonic acid, sorbic acid and methacrylic acid, derivatives of acrylamide, derivatives of methacrylamide, derivatives of acrylonitrile, and derivatives of methacrylonitrile.

18. The inflatable article according to claim 17, wherein the polymerized monomer of the thermoplastic block of the thermoplastic polyisobutylene block elastomer is copolymerized with a comonomer selected from conjugated diene monomers having from 4 to 14 carbon atoms and monomers of a vinylaromatic type having from 8 to 20 carbon atoms.

19. The inflatable article according to claim 18, wherein the comonomer is styrene.

20. The inflatable article according to claim 13, wherein a glass transition temperature ($T_g$) of the thermoplastic block is greater than or equal to 100° C.

21. The inflatable article according to claim 1, wherein the thermoplastic polyisobutylene block elastomer is the sole elastomer in the airtight elastomer layer composition.

22. The inflatable article according to claim 1, wherein the thermoplastic material of the hot-melt polymer microdomains is at a volume content of 5% to 40% of the airtight elastomer layer composition.

23. The inflatable article according to claim 22, wherein the thermoplastic material of the hot-melt polymer microdomains is at a volume content of 10% to 40% of the airtight elastomer layer composition.

24. The inflatable article according to claim 1, wherein the airtight elastomer layer composition further includes an extender oil at a content of less than 150 parts by weight per 100 parts by weight of the thermoplastic polyisobutylene block elastomer.

25. The inflatable article according to claim 24, wherein the airtight elastomer layer composition includes the extender oil at a content of less than 100 parts by weight per 100 parts by weight of the thermoplastic polyisobutylene block elastomer.

26. The inflatable article according to claim 25, wherein the airtight elastomer layer composition includes the extender oil at a content of between 5 and less than 100 parts by weight per 100 parts by weight of the thermoplastic polyisobutylene block elastomer.

27. The inflatable article according to claim 24, wherein the extender oil is polybutene.

28. The inflatable article according to claim 24, wherein the extender oil is polyisobutylene.

29. The inflatable article according to claim 24, wherein a number-average molecular weight of the extender oil is between 200 and 25,000 g/mol.

30. The inflatable article according to claim 1, wherein the airtight elastomer layer composition further includes a platy filler at a content of between 2% and 20% by volume.

31. The inflatable article according to claim 1, wherein the inflatable article further comprises rubber.

32. The inflatable article according to claim 31, wherein the inflatable article is a pneumatic tyre.

33. The inflatable article according to claim 31, wherein the article is an inner tube.

34. The inflatable article according to claim 33, wherein the inner tube is an inner tube for a pneumatic tyre.

* * * * *